Figure 1:
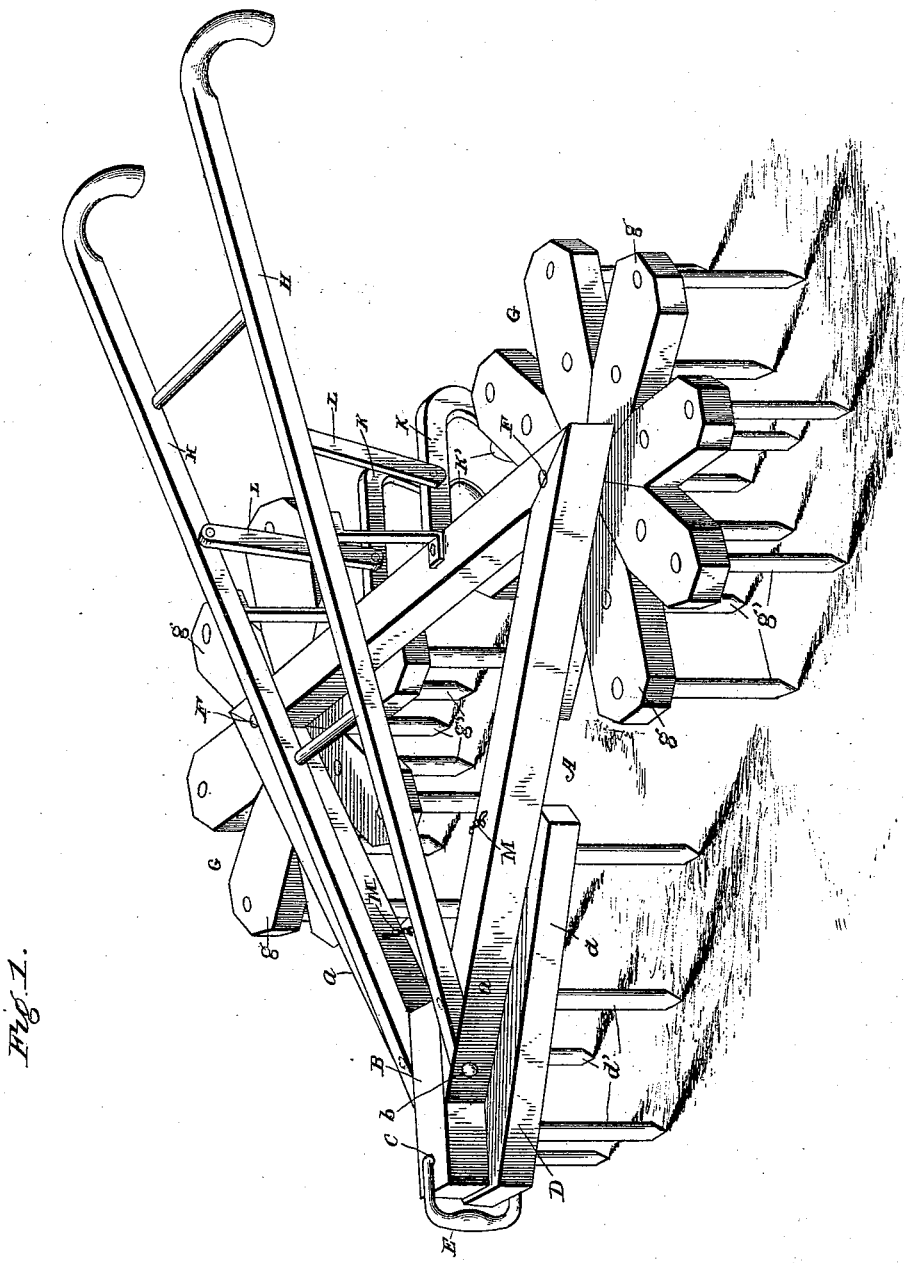

(No Model.)
2 Sheets—Sheet 1.

F. P. MORGAN.
CULTIVATOR.

No. 487,933. Patented Dec. 13, 1892.

Witnesses
F. M. Johnson

Inventor
F. P. Morgan
By his Attorneys,
C. A. Snow & Co.

(No Model.) 2 Sheets—Sheet 2.
F. P. MORGAN.
CULTIVATOR.
No. 487,933. Patented Dec. 13, 1892.
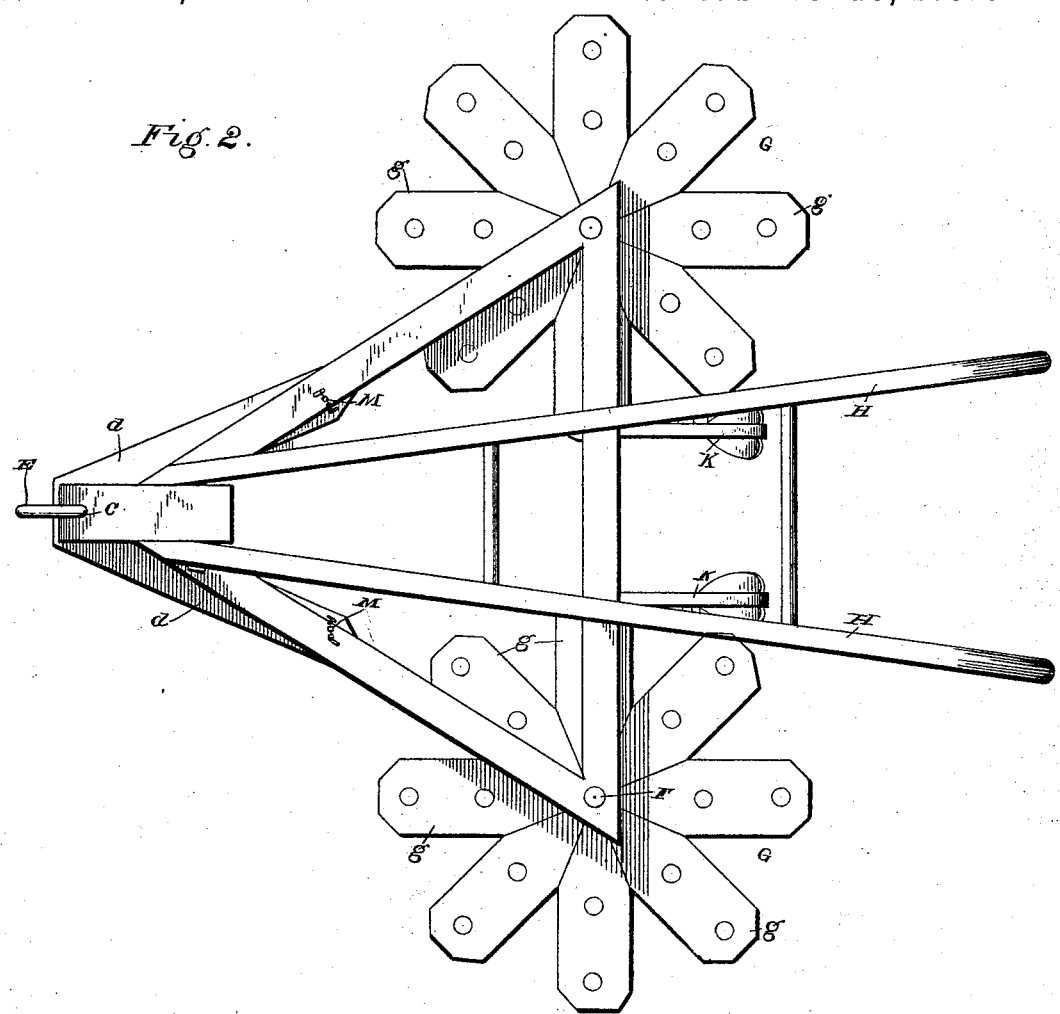
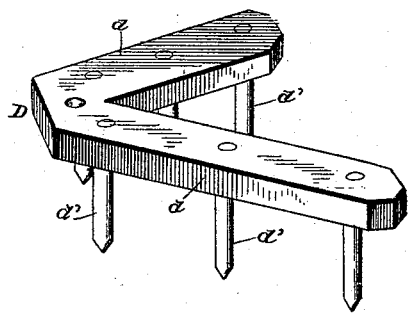
Witnesses  
Inventor  
F. P. Morgan  
By his Attorneys,

UNITED STATES PATENT OFFICE.

FRANKLIN P. MORGAN, OF ORONO, LOUISIANA.

CULTIVATOR.

SPECIFICATION forming part of Letters Patent No. 487,933, dated December 13, 1892.

Application filed June 30, 1892. Serial No. 438,607. (No model.)

*To all whom it may concern:*

Be it known that I, FRANKLIN P. MORGAN, a citizen of the United States, residing at Orono, in the parish of Claiborne and State of Louisiana, have invented a new and useful Cultivator, of which the following is a specification.

My invention relates to improvements in harrows, and has for its object to provide a simple, cheap, and effective machine to prepare the soil for the reception of corn, cotton, vegetables, and grain; and the construction and arrangement of parts are fully described hereinafter in connection with the drawings, and the novel points of the invention are specifically pointed out in the claims hereto appended.

In the drawings, Figure 1 is a perspective view of a harrow embodying my improvements. Fig. 2 is a plan view of the same. Fig. 3 is a detail view of the V-shaped advance section.

The triangular frame A is provided at its front angle with a pivoted block B, mounted near its rear end upon a horizontal pivot $b$, which connects the free ends of the convergent sides $a\ a$ of the frame. Upon a vertical king-bolt C in the front end of said block and arranged below the block is a V-shaped advance harrow D, having the rearwardly-divergent arms $d\ d$, carrying harrow-teeth $d'\ d'$. To the king-bolt is attached the clevis E for the attachment of the team.

Upon vertical pivot-bolts F F at the rear angles of the triangular frame are mounted rotary harrow-frames G G, comprising radial arms $g\ g$, provided with depending teeth $g'\ g'$. The adjacent sides of these rotary frames are separated sufficiently to allow space between for the row, as explained hereinafter. The handles of the harrow are secured at their front ends to the side bars of the triangular frame, near the front angle, and at intermediate points to the rear bar of the triangular frame upon opposite sides of its center, and thence said handles are extended to the rear and curved into a convenient shape to be held by the operator. Stocks K K for foot-plows K' K' are attached to the center of the rear bar of the triangular frame and extend to the rear between the handles, which are designated H. Vertical brace-bars L extend from the stocks to the handles to add strength to the former.

Having thus described the construction of my cultivator, the operation thereof is as follows: The V-shaped harrow, which is capable of slight vertical play and a lateral or swinging movement, limited by the guard-chains M M, by which the rear ends of the divergent arms are connected to the side bars of the triangular frame, is designed to loosen the surface of the earth along the row, the rotary frames remove rubbish from opposite sides of the row, and the foot-plows remove the earth from the row and prepare the ground for the reception of the seed.

From the above description it will be seen that the frame of my improved cultivator is simple, being triangular in shape, the teeth-supporting frames being attached directly to said frame, with the exception of the V-shaped harrow, which is carried by a block set between the front adjacent ends of the side bars of the frame.

Having described my invention, I claim—

1. In a cultivator, the combination, with a triangular frame, of an independent V-shaped harrow pivotally mounted at the front angle of said frame and rotary harrows mounted upon pivots at the side angles of the frame, substantially as specified.

2. In a cultivator, the combination, with a triangular frame having the front ends of its side bars separated, of a swinging block pivoted between said front ends, the V-shaped harrow pivoted at its front end to said block, and the rotary harrows mounted upon vertical pivots at the side angles of the frame, substantially as specified.

3. In a cultivator, the combination, with the triangular frame carrying rotary harrow-frames, of the V-shaped harrow pivoted at its apex to the frame at its front angle and having its divergent arms connected to the side bars of the frame by guard-chains, substantially as specified.

In testimony that I claim the foregoing as my own I have hereto affixed my signature in the presence of two witnesses.

FRANKLIN P. MORGAN.

Witnesses:
J. H. SIMMONS, Jr.,
J. B. SIMMONS.